United States Patent [19]

Sasajima et al.

[11] Patent Number: 4,976,169
[45] Date of Patent: Dec. 11, 1990

[54] METHOD OF CONTROLLING SPEED REDUCTION RATIO FOR A CONTINUOUSLY VARIABLE TRANSMISSIONS

[75] Inventors: Koji Sasajima, Tokyo; Yoshikazu Ishikawa, Saitama, both of Japan

[73] Assignee: Honda Giken Kogyo Kabushiki Kaisha, Tokyo, Japan

[21] Appl. No.: 270,538

[22] Filed: Nov. 14, 1988

[30] Foreign Application Priority Data

Nov. 16, 1987 [JP] Japan .................. 62-288942

[51] Int. Cl.$^5$ .......................... B60K 41/12
[52] U.S. Cl. ..................... 74/866; 74/877; 74/731.1; 364/424.1
[58] Field of Search ............... 74/866, 687, 877, 880, 74/731.1; 364/424.1

[56] References Cited

U.S. PATENT DOCUMENTS

| | | | |
|---|---|---|---|
| 4,229,998 | 10/1980 | Mizuno et al. | 74/865 |
| 4,444,093 | 4/1984 | Koga et al. | 91/488 |
| 4,561,327 | 12/1985 | Niwa et al. | 74/859 X |
| 4,594,916 | 6/1986 | Ito et al. | 364/424.1 X |
| 4,637,279 | 1/1987 | Itoh et al. | 74/866 |
| 4,649,485 | 3/1987 | Osanai et al. | 364/424.1 |
| 4,653,006 | 3/1987 | Osanai et al. | 364/424.1 |
| 4,665,775 | 5/1987 | Nagamatsu et al. | 74/868 |
| 4,683,779 | 8/1987 | Osanai et al. | 74/861 |
| 4,689,745 | 8/1987 | Itoh et al. | 364/424.1 |
| 4,689,956 | 9/1987 | Hein | 60/449 |
| 4,701,853 | 10/1987 | Osanai | 74/866 X |
| 4,710,879 | 12/1987 | Vahabzadeh | 74/866 X |
| 4,745,748 | 5/1988 | Hayashi et al. | 60/489 |
| 4,753,133 | 6/1988 | Itoh et al. | 74/866 |
| 4,776,233 | 10/1988 | Kita et al. | 74/687 |
| 4,782,934 | 11/1988 | Takano et al. | 74/866 X |
| 4,829,433 | 5/1989 | Nakano et al. | 74/867 X |

FOREIGN PATENT DOCUMENTS

| | | |
|---|---|---|
| 0168540 | 1/1986 | European Pat. Off. |
| 0231059 | 8/1987 | European Pat. Off. |
| 0240178 | 10/1987 | European Pat. Off. |
| 55-155949 | 12/1980 | Japan .................. 74/866 |
| 57-70968 | 5/1982 | Japan. |
| 58-191360 | 11/1983 | Japan. |
| 60-95263 | 5/1985 | Japan. |
| 62-83228 | 4/1987 | Japan .................. 74/866 |
| 62-83229 | 4/1987 | Japan .................. 74/866 |
| 62-237164 | 10/1987 | Japan. |

Primary Examiner—Dwight Diehl
Attorney, Agent, or Firm—Lyon & Lyon

[57] ABSTRACT

A method controlling the speed reduction ratio for a continuously variable speed transmission comprises a running mode control method which is carried out when an accelerator opening is opened, an engine brake mode control method which is carried out when said accelerator opening is substantially closed and a transient control method which is carried out over a predetermined period of time when the control is shifted from a state under the engine brake mode control to a state under the running mode control. The transient control method comprises the steps of obtaining a corrected R-REF engine speed immediately after the shift to the running mode control, by adding a difference between the actual engine speed and the R-REF engine speed to the R-REF engine speed set in correspondence to the current accelerator opening, obtaining a further corrected R-REF engine speed during a predetermined period of time following the shift, by adding a correction which is obtained by gradually decreasing the speed difference with time to the R-REF engine speed, and controlling the speed reduction ratio so that the actual engine speed coincides with the corrected R-REF engine speed over the predetermined period of time.

13 Claims, 5 Drawing Sheets

METHOD OF CONTROLLING SPEED REDUCTION RATIO FOR A CONTINUOUSLY VARIABLE TRANSMISSIONS

BACKGROUND OF THE INVENTION

As a means for controlling a speed reduction ratio of a vehicle equipped with a continuously variable speed transmission, there has been known a method in which engine speed is matched with a reference engine speed (which will be hereinafter referred to as R-REF engine speed) set in correspondence to a throttle opening of the engine (see, for example, Japanese Pat. Laid Open Publication No.62(1987)-237164).

Such control may be accomplished by setting a R-REF (running reference) engine speed corresponding to an accelerator opening (i.e., the depressed amount of an accelerator pedal or the throttle opening) when the accelerator pedal has been depressed or the throttle is not closed. However, if the R-REF engine speed is to be set in correspondence to the accelerator opening in the manner as mentioned above, the engine speed will be too low to obtain sufficient engine brake effect when the accelerator pedal is released and the accelerator opening is substantially zero (as encountered in engine braking the vehicle for deceleration).

In order to avoid this problem and to obtain a desirable engine brake, a ratio control has been carried out conventionally by setting a reference engine speed corresponding to the vehicle speed. The reference engine speed is referred to as a EB-REF (engine-brake reference) engine speed hereinafter.

Under such control, if the accelerator opening is reduced to substantially zero during running by releasing the accelerator pedal, a proper EB-REF engine speed is set and a desirable engine brake effect can be obtained. However, the R-REF engine speed thus set in correspondence to the accelerator opening in a region of small accelerator opening becomes lower than said EB-REF engine speed. As a result, when a ratio control is switched from an engine brake mode where the accelerator opening is substantially zero (the control based on the EB-REF engine speed) to a running mode where the R-REF engine speed is set based on the accelerator opening, the R-REF engine speed may become very low. Namely the R-REF engine speed may become lower than the EB-REF engine speed if the transition from the engine-brake mode to the running mode is made in a region of small accelerator opening. Accordingly, a small depression of the accelerator pedal under the engine brake mode will lower the engine speed, giving the driver an uncomfortable driving feeling.

SUMMARY OF THE INVENTION

It is an object of the invention to provide a ratio control method that can increase the engine speed in response to the actuation of the accelerator during running under an engine brake mode.

In order to accomplish this object according to the invention when the accelerator is operated so as to increase the accelerator opening while running in the engine brake mode, the R-REF engine speed is corrected soon after a shift to the running mode by adding a difference between the actual engine speed and the reference running engine speed to the R-REF engine speed, thereby obtaining a corrected R-REF engine speed. Next, over a certain period of time following the correction, the R-REF engine speed is corrected by adding another correction, which is obtained by gradually decreasing said speed difference with time, to the R-REF engine speed to obtain a further corrected R-REF engine speed. Thus the ratio control that follows the shift to the running mode is carried out using said corrected R-REF engine speed.

With the above ratio control method, the vehicle can be properly decelerated with the predetermined engine brake effect as a result of the ratio control in the engine-brake mode when the acceleration opening is substantially closed, while in the case the accelerator opening is not zero, the speed reduction ratio is so controlled that the engine speed coincides with the R-REF engine speed set in correspondence to the accelerator opening. On the other hand, when the accelerator pedal is depressed during running in the engine-braking mode thus shifting to the running mode, the R-REF engine speed corresponding to the accelerator opening is corrected over a certain period of time after the shift based on the difference between this R-REF speed and the actual engine speed (provided that the actual engine speed is greater than the R-REF speed). The ratio control is carried out based on this corrected R-REF engine speed. Consequently, if the accelerator pedal is depressed during running in the engine-braking mode, the engine speed is so controlled as to increase in response to the accelerating pedal depression thereby improving the driving feeling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus are not limitative of the present invention and wherein.

DESCRIPTION OF THE PREFERRED EMBODIMENTS

Figure 1:
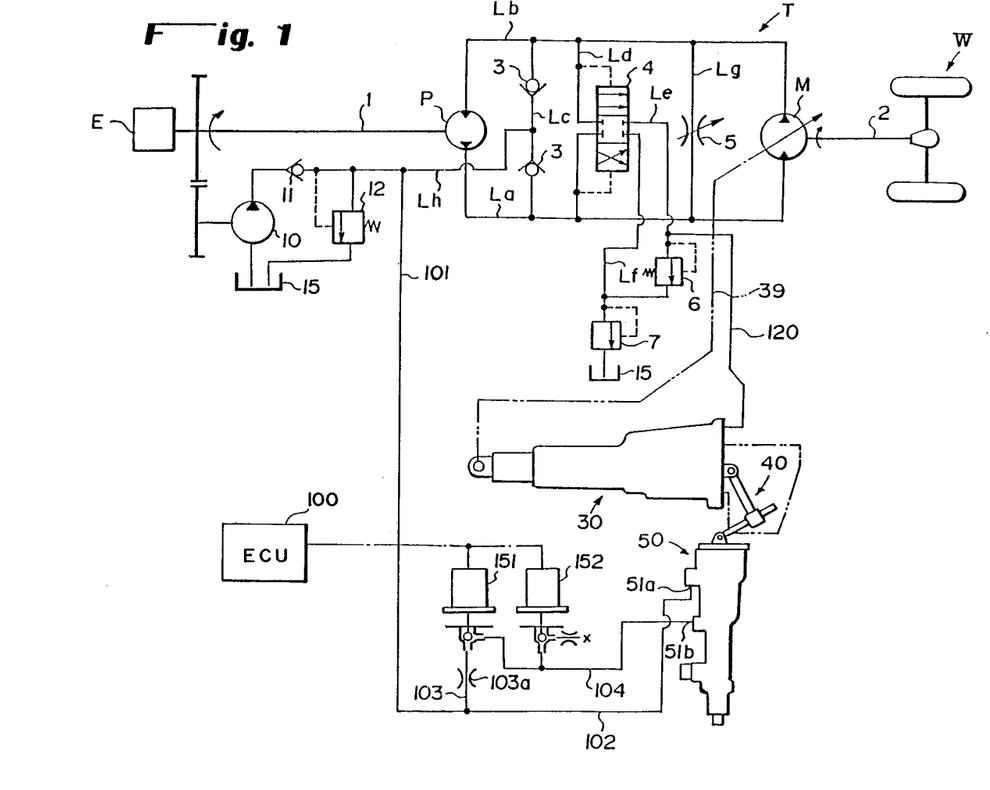
FIG. 1 is a hydraulic circuit of a continuously variable speed transmission to be controlled by the method in accordance with the invention.

FIG. 1 shows a hydraulic circuit diagram of a continuously variable speed transmission whose speed reduction ratio is controlled by a method according to the invention. The continuously variable speed transmission has a constant displacement hydraulic pump P driven by the engine E through an input shaft 1 and a variable displacement hydraulic motor M connected to an output shaft 2 driving wheels W. The hydraulic pump P and motor M constitute a closed hydraulic circuit along with two hydraulic lines: the first hydraulic line La by which the delivery port of the pump P communicates with the suction port of the motor M, and the second hydraulic line Lb by which the suction port of the pump P communicates with the delivery port of the motor M.

A charge pump 10 driven by the engine E is connected to the close circuit through a charge hydraulic line Lh having a check valve 11 and through a third hydraulic line Lc having a pair of check valves 3 and 3. Hydraulic oil pumped up by the charge pump 10 form an oil sump 15 and regulated in its pressure by a charge pressure relief valve 12 is supplied to either of the two hydraulic lines La or Lb which has lower pressure through the check valves 3, 3. A fourth hydraulic line Ld having a shuttle valve 4 is connected to the closed circuit. To the shuttle valve 4 is connected fifth and sixth hydraulic lines Le and Lf which respectively have a high pressure relief valve 6 and a low pressure relief valve 7 with outlets to the oil sump 15. The shuttle valve 4 is a 2-port 3-position selector valve, which is operated in response to a hydraulic pressure difference of the first and second hydraulic lines La and Lb to shift to either of the extreme positions to connect either of the first or second hydraulic lines La, Lb having higher pressure to the fifth hydraulic line Le as well as to connect the other hydraulic line having lower pressure to the sixth hydraulic line Lf. Therefore, the relief pressure of a higher pressure line is regulated by the high pressure relief valve 6, and the relief hydraulic pressure of the other lower pressure-side line is regulated by the low pressure relief valve 7. When the pressures in the hydraulic lines La and Lb are equal, the valve 4 is in the central position for closing the line Ld.

Between the first and second hydraulic lines La and Lb is provided a seventh hydraulic line Lg to short-cut circuit between the two lines. The seventh hydraulic line Lg is provided with a clutch valve 5, which is a variable opening control valve to control the opening degree of the line. Therefore, the opening control of the clutch valve 5 can effect clutch control to control the transmission of driving force from the hydraulic pump P to the hydraulic motor M.

Actuators for displacement control of the hydraulic motor M to control speed reduction ratio of the continuously variable speed transmission T are a first and a second ratio control servo unit 30, 50 which are connected with each other by means of a link mechanism 40. The hydraulic motor M is of a swash plate axial piston type, and its displacement is changed by the control of swash plate angle by means of the ratio control servo units 30, 50.

The operation of the ratio control servo units 30, 50 is controlled by solenoid valves 151, 152 which are duty-ratio-controlled by signals from a controller 100. The controller 100 receives signals corresponding to a vehicle speed V, an engine speed Ne, a throttle opening $\ominus$th, a swash plate slant angle $\ominus$tr of the hydraulic motor M, an accelerator pedal opening $\ominus$acc operated by the driver, and an acceleration dV/dt of the vehicle. Based on these signals, the controller 100 outputs signals for controlling the above solenoid valves so as to effectuate desirable vehicle traveling controls.

Figure 2:
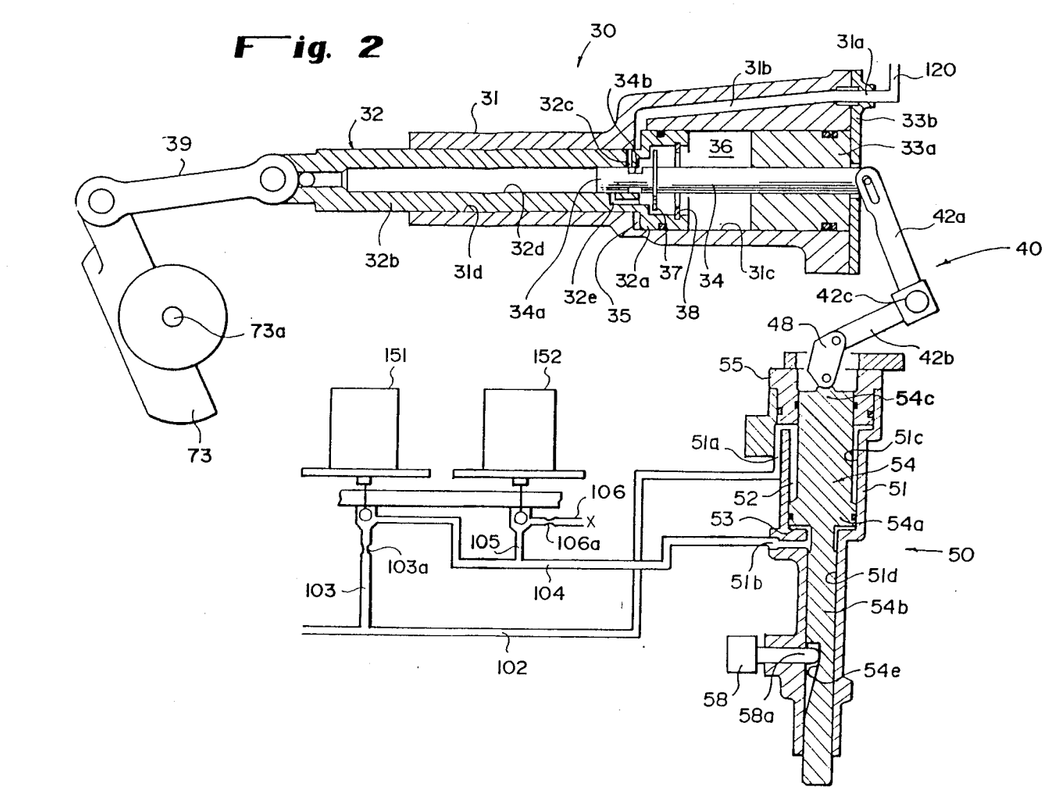
FIG. 2 shows the cross sections of a first and second ratio control servo unit.

The structures and operations of the above servro units 30, 50 are described in detail below based on FIGS. 1 and 2.

The first ratio control servo unit 30 controls the swash plate angle of the hydraulic motor M with the help of the high hydraulic pressure fed from the closed hydraulic circuit of the transmission T through the shuttle valve 4, the fifth line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 is slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b having a smaller diameter than that of the cylinder hole 31c is inserted into a rod hole 31d which is concentric with the cylinder hole 31c. The right cylinder chamber 36 is covered by a plug member 33a and cover 33b through which the right end of the spool member 34 protrudes.

The high pressure line 120 connected to the port 31a communicates with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 36 to the oil sump (not shown) through the spool hole 32d responding to the rightward motion of the spool member 34 and a connection passage 32c which can connect the left cylinder chamber 35 to the right cylinder chamber 36 through th dents 34b responding to the leftward motion of the spool member 34 are formed in the piston member 32.

When the spool member 34 is moved rightward, the land portion 34a blocks the connection passage 32c and opens the drain passage 32e. Accordingly the hydraulic pressure fed through the high pressure line 120 is led in the left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where pressure is applied and therefore the piston member 32 is moved so as to follow the spool member 34.

When the spool member 34 is held still, the piston member 32 is also held still creating a hydraulically balanced state because of a pressure balance between the left and right cylinder chambers 35, 36. As discussed, when the spool member 34 is moved leftward or rightward, the piston member 32 is moved laterally so as to follow the spool member 34 with the help of the high hydraulic pressure fed through the high pressure line 120. Accordingly the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore, when the spool member 54 of the second servo unit 50 is moved up or down, the spool member 34 of the first servo unit 30 is moved rightward or leftward.

The second servo unit 50 comprises a housing 51 having ports 51a, 51b to which hydraulic lines 102, 104 are connected respectively, and the spool member 54 vertically slidably fitted in the housing 51. The spool member 54 consists of a piston portion 54a, an end spool portion 54b coaxially extending downward and a rod portion 54c coaxially extending upward therefrom. The piston portion 54a is inserted into a cylinder hole 51c of the housing 51 and divides the space inside the cylinder hole 51c covered by a cover 55 into two chambers defining a upper and a lower cylinder chamber 52, 53. The end spool portion 54b is inserted into a rod hold 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a if the speed reduction ratio has become minimum since the pushed-up spool 58a turns the switch 58 on.

Further, the hydraulic lines 102, 104 communicates respectively with the upper and lower cylinder chambers 52, 53 through the ports 51a, 51b. The spool member 54 is moved up or down by the difference of hydraulic forces applied to the piston portion 54a which are determined based on the differences of hydraulic pressures and of areas where the hydraulic pressures in the cylinder chambers 52, 53 are applied. The up and down motions of the spool member 54 are transmitted to the spool member 34 of the first servo unit 30 by the link mechanism 40 causing left and right motions of the spool member 34. In other words, the control of the hydraulic pressures supplied through the hydraulic lines 102, 104 enable control of the motion of the spool member 34 and the piston member 32 in the first servo unit 30 and also enable to control the swash plate angle of the hydraulic motor M and the displacement thereof. In fact, when the spool member 54 of the second servo unit 50 is moved up, the piston member 32 of the first servo unit 30 is moved rightward lessening the swash plate angle, the displacement of the hydraulic motor M and the speed reduction ratio.

The pressurized oil in the hydraulic line 102 connecting the port 51a with the upper cylinder chamber 52 is sent through a hydraulic lines 101 and 102 from the delivery liner of the charge pump 10 after its pressure is regulated by the charge pressure relief valve 12. The oil pressure in the hydraulic line 104 connecting the port 51b with the lower cylinder chamber 53 is obtained by regulating the oil pressure in a hydraulic line 103 (including an orifice 103a therein), which is branched from the hydraulic line 102, by the first and second duty-ratio-controlled solenoid valves 151 and 152. The first solenoid valve 151 duty-ratio-controls the flow rate of the oil flowing from the hydraulic line 103 (having the orifice 103a therein) to the hydraulic line 104. The second solenoid valve 152 is disposed between a hydraulic line 105 branched from the line 104 and a hydraulic line 106 communicating with the drain through an orifice 106a, and duty-ratio-controls drain-flow of the hydraulic oil from the line 104 in accordance with a given duty ratio.

As a result, to the upper cylinder chamber 52 a charge pressure regulated by the charge pressure relief valve 12 is applied through the line 102, while to the lower cylinder chamber 53 is supplied from the line 104 a lower pressure than the charge pressure which is regulated by the first and second solenoid valves 151 and 152. Since the pressure applied area of the upper cylinder chamber 52 is smaller than that of the lower cylinder chamber 53, the forces of oil pressures in the cylinder chambers 52 and 53 acting on the spool member 54 keep their balance when the oil pressure in the lower cylinder chamber 53 is a specified value P1 which is smaller than the oil pressure Pu in the upper cylinder chamber 52 (Pu > P1). Therefore, when the oil pressure supplied into the lower cylinder chamber 53 from the line 104 is controlled by the first and second solenoid valves 151 and 152 so as to be higher than the above pressure P1, the spool member 54 is moved upward to result in a small swash plate angle of the hydraulic motor M, i.e., to result in a small speed reduction ratio, while when the oil pressure supplied into the lower cylinder chamber 53 from the line 104 is controlled so as to be smaller than the above pressure P1, the spool member 54 is moved downward to result in a large swash plate angle of the hydraulic motor M, i.e., to result in a large speed reduction ratio. Furthermore, a speed reduction ratio detecting sensor (not shown), which is a potentiometer to detect the swash plate angle, is mounted on the trunnion 73a of the swash plate 73.

The solenoid valves 151 and 152 are controlled by signals from the controller 100. Only by controlling the operations of the two solenoid valves 151 and 152 based on the signals from the controller 100, are the actuations of the first and second ratio control servo units 30 and 50 controlled, the result of which is the control of the displacement of the hydraulic motor M, in other words the control of the speed reduction ratio.

Figure 3:
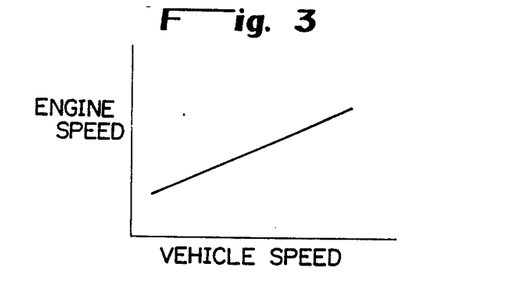
FIG. 3 and 4 are graphs showing the EB-REF engine speed and the R-REF running engine speed, respectively.

In this ratio control, when the acceleration opening is substantially zero during running, i.e., the acceleration pedal is not depressed, the vehicle is decelerated under engine braking. The reference engine speed (the EB-REF engine speed) is set in correspondence to the vehicle speed, as shown in FIG. 3. The engine speed is so controlled as to coincide with this reference engine speed.

Figure 4:
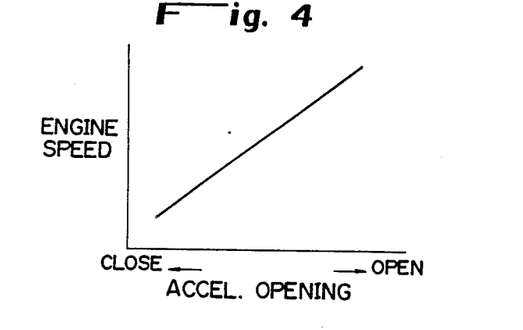
Figure 5:
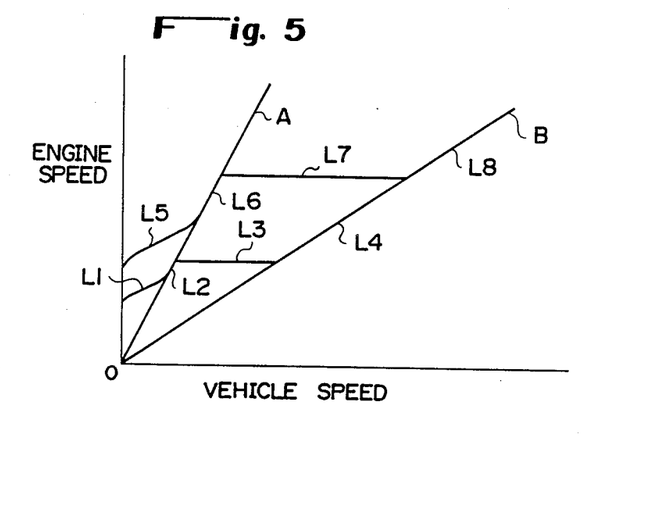
FIG. 5 shows running characteristics of a vehicle equipped with the above mentioned continuously variable speed transmission.

On the other hand, when the acceleration pedal is depressed, the reference engine speed (the R-REF engine speed) is set in correspondence to the accelerator opening as shown in FIG. 4. The engine speed is so controlled as to coincide with the R-REF engine speed. As a result of such a ratio control (referred to as a control in a running mode), when the accelerator pedal is depressed to accelerate the vehicle, the speed of the vehicle is varied, as shown in FIG. 5, from L1 (clutch engagement) to L2 (acceleration along the maximum reduction ratio line A) to L3 (acceleration of the vehicle by varying the speed reduction ratio with the R-REF engine speed being kept constant). When the accelerator pedal is slowly depressed for further acceleration after the vehicle has reached the minimum reduction ratio line B, the acceleration proceeds along the line L4. It is noted that the vehicle speed may be varied differently depending on the way the pedal is depressed. Namely, if the pedal is quickly depressed, the speed will vary as indicated by L5 to L6 to L7 to L8.

The method according to the invention is different from the above ordinary speed reduction ratio control method. The invention provides a different ratio control when the accelerator pedal is depressed during running in the engine-brake mode, shifting to the running mode. This control will be described below with reference to the flow chart in FIG. 6.

Figure 6:
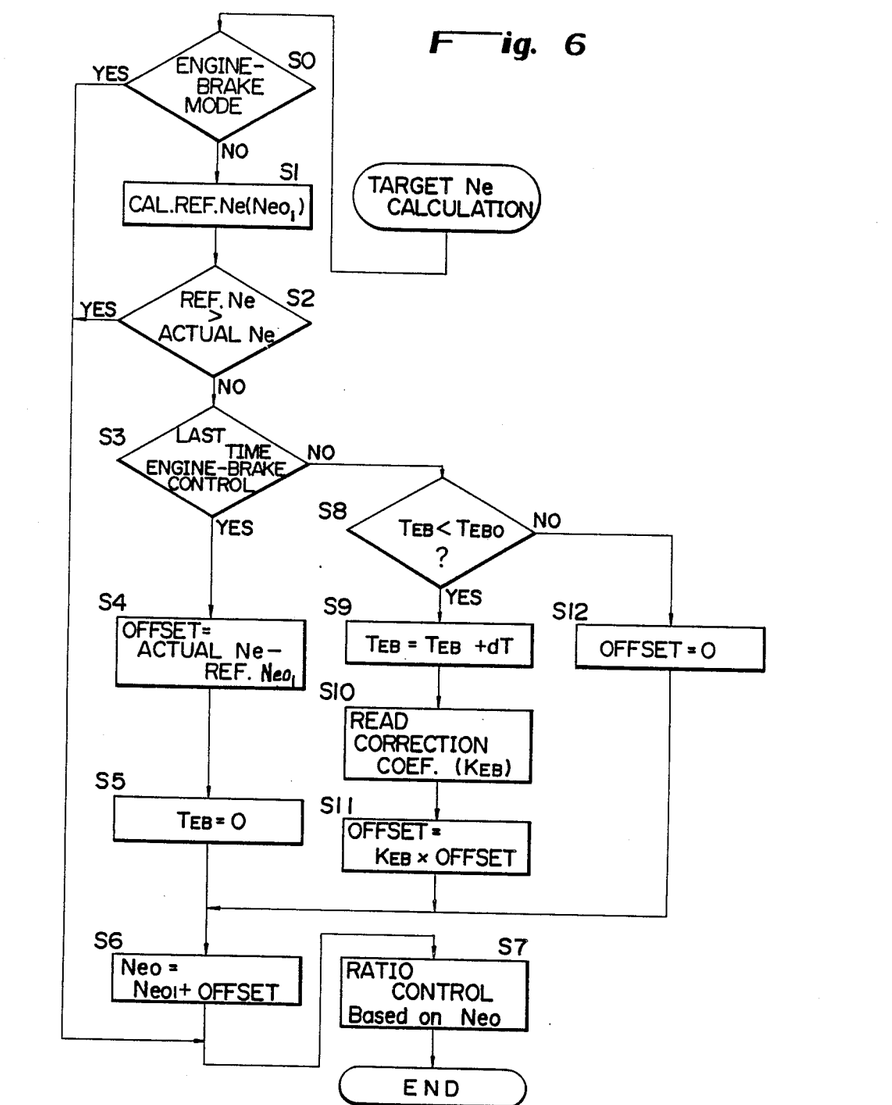
FIG. 6 is a flow chart of a method of the ratio control operations according to the invention.

In this control method, it is judged in step S0 whether the mode is the engine-brake mode or not. If the mode is the engine-brake mode, the ratio control is not affected by the control according to the invention. On the other hand if the mode is not the engine-brake mode, a R-REF engine speed $Neo_1$ corresponding to the accelerator opening is obtained in step S1 based on, for example, the calibration in FIG. 4.

In step S2, the R-REF engine speed is judged if it is greater than the actual engine speed or not. If it is greater than the actual engine speed, the control proceeds directly to step S7, while if is not, the control proceeds to step S3.

Next, in step S3, it is judged if the engine-brake control has been done in the preceding control or not. The purpose is to check whether or not the preceding ratio control was done in the engine brake mode. If it was done in the engine brake mode, the difference (OFFSET) between the actual engine speed NE and the above R-REF engine speed $Neo_1$ is calculated in step S4. In this calculation, the EB-REF engine speed may be substituted for the actual engine speed, since the actual engine speed at this time is substantially equal to the reference engine-braking engine speed. Subsequently, in step S5, a time $T_{EB}$ is set at zero, and then in step S6 a corrected R-REF engine speed Neo, which is the sum of step R-REF engine speed $Neo_1$ and said difference OFFSET, is calculated. In step S7, the speed reduction ratio is controlled based on the corrected R-REF engine speed Neo.

Figure 7:
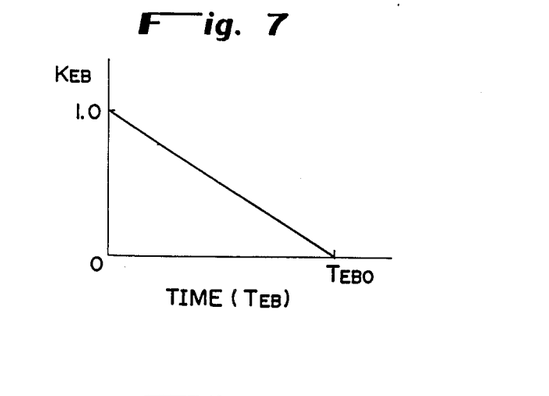
FIG. 7 is a graph showing the relationship between the correction factor and time used in the ratio control.

When, in step S3 it is judged that the preceding control is not conducted in the engine-brake mode, the time $T_{EB}$ is judged whether it is greater or smaller than the predetermined time $T_{EBO}$. In other word, it is judged if the predetermined time $T_{EBO}$ has elapsed after the shift from the engine brake mode to the running mode. If the time $T_{EBO}$ has not elapsed, the time $T_{EB}$ is increased by a increment dT in step S9, and then in step S10 a reference engine speed correction factor $K_{EB}$ is determined by the graph in FIG. 7. Then, the difference OFFSET is corrected by being multiplied by the factor $K_{EB}$ in step S11. Based on this corrected difference OFFSET, the corrected R-REF engine speed Neo is obtained in step S6, according to which the ratio control is carried out.

If in steps S8 it is judged that the time $T_{EBO}$ has elapsed, the speed difference OFFSET is set as zero, and the operations in steps S6 and S7 will follow, effecting the ratio control which is conducted based on the R-REF engine speed set in correspondence to the accelerator opening.

The judgment in step S8 may alternatively be done by checking the value of the speed difference OFFSET, since it becomes zero after the predetermined period of time.

Figure 8:
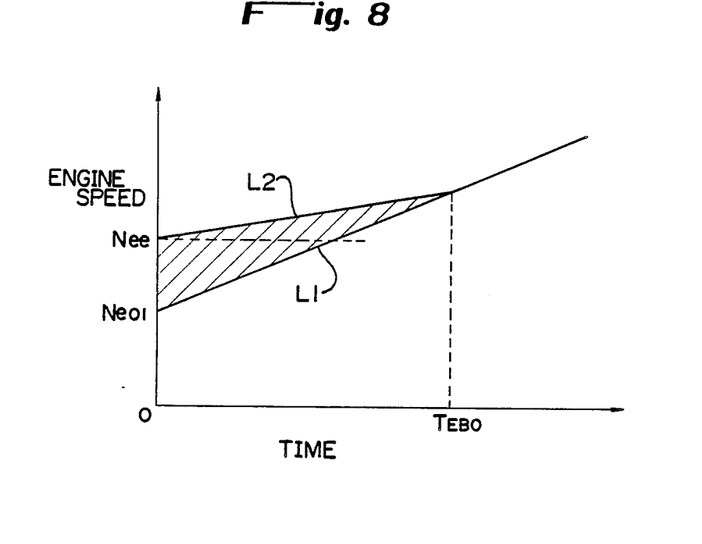
FIG. 8 is a graph showing the engine speed as a function of time as realized by the ratio control.

Referring to FIG. 8, the variation of the engine speed under the ratio control as mentioned above will now be described. The ordinate and abscissa of the figure are taken for the engine speed and time, respectively, the figure indicates the variation in engine speed after the control has been shifted from the engine-brake mode to the running mode. It is seen that immediately after the shift the engine rotates at a speed of the EB-REF engine speed Nee. The R-REF engine speed $Neo_1$ which is set in correspondence to the accelerator opening is smaller than the EB-REF engine speed Nee, so that there is a difference OFFSET in speed between Nee and $Neo_1$.

At a point in time immediately after the shift, the corrected reference engine speed Neo is obtained by adding the speed difference OFFSET to the R-REF engine speed $Neo_1$. As a result, the corrected R-REF engine speed Neo coincides with the actual engine speed at that moment. Then, since said speed difference OFFSET is corrected so as to gradually decrease with time using the correction factor $K_{EB}$ shown in FIG. 7, the actual engine speed is increased as indicated by the line L2 in response to the depression of the accelerator pedal, although the R-REF engine speed set in correspondence to the accelerator opening varies as indicted by the line L1.

Under such control, when the accelerator pedal is depressed during running in the engine-brake mode, the engine speed is increased from the speed which was set in the engine-brake mode. As a result, the response of the engine speed to the actuation of the accelerator is improved.

In the above example, although the invention has been described for a continuously variable speed transmission having a hydraulic pump and a hydraulic motor, the invention is not limited to such a continuously variable speed transmission but is applicable to other types of continuously variable transmissions as will. Further, any other means that generates a hydraulic pressure corresponding to the throttle opening to operate the servo unit may also be utilized as a ratio control means, instead of the electro-hydraulic ratio control means used in the above example for electrically controlling the solenoid valve by an electric controller to operate the servo unit.

By the control method according to the invention as described above, the R-REF engine speed corresponding to the accelerator opening is corrected to give a corrected reference engine speed using the difference between the R-REF engine speed and the actual engine speed (supposing that the actual engine speed is greater than the other) within a predetermined period of time immediately after the shift from the engine-brake mode to the running mode. Since the ratio control is provided based on the corrected reference engine speed, the engine speed is controlled to increase from the engine speed at the time of the shift in response to the actuation of the accelerator while running in the engine-brake mode. This improves responses of the engine speed and power to the actuation of the accelerator, ensuring a comfortable driving feeling to the driver.

What is claimed is:

1. A method of controlling speed reduction ratio in a continuously variable speed transmission comprising, a running mode control method which is carried out when an accelerator opening is opened to at least some extend and an engine brake mode control method which is carried out when said accelerator opening is substantially closed, said running mode control method comprising, determining a R-REF reference engine speed corresponding to said accelerator opening and controlling the speed reduction ratio so that an actual engine speed coincides with said R-REF reference engine speed, and said brake mode control method comprising, determining an EB-REF reference engine speed corresponding to a vehicle speed and controlling the speed reduction ratio so that the actual engine speed coincides with said EB-REF reference engine speed, said method of controlling speed reduction ratio further comprising a transient control method which is carried out over a predetermined period of time when the control is shifted from a state under said engine brake mode control to a state under said running mode control, said transient control method comprising, obtaining a corrected R-REF reference engine speed immediately after the shift from the engine brake mode control to the running mode control, by adding a correction to said R-REF reference engine speed set corresponding to a current accelerator opening, said correction being a speed difference between a first reference engine speed and said R-REF engine speed, obtaining a further corrected R-REF engine speed during said predetermined period of time following said shift, by adding instead a correction, which is obtained by gradually decreasing said speed difference with time, to the R-REF engine speed set corresponding to the current accelerator opening, and controlling the speed reduction ratio so that the actual engine speed coincides with said corrected R-REF engine speed over said predetermined period of time.

2. A method of speed reduction control as defined in claim 1, wherein said continuously variable speed transmission comprises a hydraulic pump driven by an engine and a hydraulic motor driven by hydraulic pressure supplied from said hydraulic pump, the speed reduction ratio being controlled by varying displacement of at least one of said hydraulic pump and said hydraulic motor.

3. A method of controlling a speed reduction ratio according to claim 1, wherein said first reference engine speed is the actual engine speed.

4. A method of controlling a speed reduction ratio according to claim 1, wherein said first reference engine speed is the EB-REF engine speed.

5. A method of controlling a speed reduction ratio in a continuously variable speed transmission, comprising a running mode control method which is carried out when an accelerator opening is not substantially closed and an engine brake mode control method which is carried out when said accelerator opening is substantially closed, said running mode control method comprising determining a running reference engine speed according to said accelerator opening and controlling the speed reduction ratio so that an actual engine speed coincides with said running reference engine speed, and said engine brake mode control mode comprising determining an engine brake reference engine speed corresponding to a vehicle speed and controlling the speed reduction ratio so that the actual engine speed coincides with said engine brake reference engine speed, said method of controlling the speed reduction ratio further comprising, detecting a transition from said engine brake mode to said running mode, and controlling said speed reduction ratio according to a transient control method for a predetermined period of time after said transition from said engine brake mode to said running mode so that the actual engine speed coincides with a corrected running reference engine speed during said predetermined period, said transient control method comprising, correcting the running reference engine speed shortly after the detection of said transition from said engine brake mode to said running mode by adding a correction to a value of said running reference engine speed as set according to said accelerator opening.

6. A method of controlling a speed reduction ratio according to claim 5, said transient control method further comprising, calculating said correction by subtracting said value of said running reference engine speed from said actual engine speed.

7. A method of controlling a speed reduction ratio according to claim 6, said transient control method further comprising, adjusting said correction as time passes by reducing said correction, and correcting, as time passes, the value of said running reference engine speed as set according to said accelerator opening by adding said adjusted correction to said value of said running reference engine speed.

8. A method of controlling a speed reduction ratio according to claim 7, said transient control method further comprising, adjusting said correction as time passes by multiplying said correction by a factor that decreases as time passes.

9. A method of controlling a speed reduction ratio according to claim 8, wherein said factor decreases as a function of time, from a value of one (1) immediately after said detection of said transition, to a value of zero (0) after said predetermined period of time.

10. A method of controlling a speed reduction ratio according to claim 5, said transient control method further comprising, calculating said correction by subtracting said value of said running reference engine speed from said engine brake reference engine speed.

11. A method of controlling a speed reduction ratio according to claim 10, said transient control method further comprising, adjusting said correction as time passes by reducing said correction, and correcting, as time passes, the value or said running reference engine speed as set according to said accelerator opening by adding said adjusted correction to said value of said running reference engine speed.

12. A method of controlling a speed reduction ratio according to claim 11, said transient control method further comprising, adjusting said correction as time passes by multiplying said correction by a factor that decreases as time passes.

13. A method of controlling a speed reduction ratio according to claim 12, wherein said factor decreases as a function of time, from a value of one (1) immediately after said detection of said transition, to a value of zero (0) after said predetermined period of time.

* * * * *